United States Patent [19]

Schaefer et al.

[11] Patent Number: 5,371,138

[45] Date of Patent: Dec. 6, 1994

[54] ULTRAVIOLET BLOCKING POLYSILOXANE RESIN AND PROCESS FOR MAKING THE SAME

[75] Inventors: Joy M. Schaefer, Park Ridge, Ill.; David Ganbarg, Richmond, Ind.

[73] Assignee: Tru Vue, Inc., Chicago, Ill.

[21] Appl. No.: 748,485

[22] Filed: Aug. 21, 1991

Related U.S. Application Data

[63] Continuation-in-part of Ser. No. 728,611, Jul. 11, 1991, which is a continuation-in-part of Ser. No. 557,676, Jul. 24, 1990, abandoned.

[51] Int. Cl.⁵ ............................................. C08K 5/13
[52] U.S. Cl. ................................. 524/739; 524/766; 524/858
[58] Field of Search ...................... 524/766, 858, 739

[56] References Cited

U.S. PATENT DOCUMENTS

| | | | |
|---|---|---|---|
| 4,113,665 | 9/1978 | Law et al. | 524/863 |
| 4,146,658 | 3/1979 | Humphrey | 427/160 |
| 4,349,602 | 9/1982 | Ching | 428/331 |
| 4,353,959 | 10/1982 | Olson et al. | 428/331 |
| 4,355,135 | 10/1982 | January | 524/767 |
| 4,382,109 | 5/1983 | Olson et al. | 428/331 |
| 4,476,281 | 10/1984 | Vaughn, Jr. | 524/858 |
| 4,513,061 | 4/1985 | Kawakubo et al. | 428/429 |
| 4,531,061 | 4/1985 | Kawakubo et al. | 428/429 |
| 4,555,545 | 11/1985 | Kimura et al. | 524/588 |
| 4,555,559 | 11/1985 | Kimura et al. | 528/28 |
| 4,765,729 | 8/1988 | Taniguchi | 351/163 |
| 4,978,702 | 12/1990 | Yuyama et al. | 524/858 |
| 5,091,465 | 2/1992 | Dana et al. | 524/588 |

Primary Examiner—Melvyn I. Marquis
Assistant Examiner—Karen A. Dean
Attorney, Agent, or Firm—Robert E. Browne; Jeannine M. Pisoni

[57] ABSTRACT

A poysiloxane resin composition includes a blend of silanols, colloidal silica, an ultraviolet-absorbing material, and a dye for correcting the color of a film formed from the resin composition. The silanols include a silanol from the group having the formula $R_wSi(OH)_x$ or $R_ySi(OR')_z$ where $(w+x)$ or $(y+z)=4$, and R and R' are organic radicals without any crosslinking sites, silanol from the group having the formula $R''Si(OR''')_3$ where $R''$ is a hydrogen atom or an organic radical and $R'''$ is an organic radical containing a crosslinking site. The resin may be cured at 420° F. The ultraviolet-absorbing material may be a benzophenone, a benzotriazole, or a benzothiazole. A process for forming the resin composition includes reacting the silanols and the ultraviolet-absorbing material under continuous agitation for about six hours.

10 Claims, 2 Drawing Sheets

ULTRAVIOLET BLOCKING POLYSILOXANE RESIN AND PROCESS FOR MAKING THE SAME

This application is a continuation-in-part of application Ser. No. 07/728,611, filed Jul. 11, 1991, which is, in turn, a continuation-in-part of application Ser. No. 07/557,676, filed Jul. 24, 1990, now abandoned.

BACKGROUND OF THE INVENTION

The present invention relates generally to polysiloxane resins. It relates specifically to ultraviolet radiation absorbing polysiloxane resins which may be applied to a transparent sheet using a roll coating process.

Polysiloxane resins are known to be useful as durable overcoating materials for plastics, especially for transparent plastics. A polysiloxane resin may be formed from an aqueous alcoholic composition including silanols. The resin so formed may be hardened by a process such as heat curing. Colloidal silica may be added to the silanol composition so that the polysiloxane resin formed from the composition includes silica. The silica containing resin may be harder than most transparent plastic materials and may be used as a hard overcoating for plastic materials. A hard overcoating may be used on plastic lenses for corrective or protective eyewear. A hard overcoating may also be used to prevent abrasion of plastic lenses for automotive headlamps.

A polysiloxane resin may include a material which absorbs ultraviolet light. Thus, a hard overcoating for a plastic eyeglass lens may provide ultraviolet protection for a user as well as abrasion resistance for the lens surface.

An ultraviolet-absorbing polysiloxane resin may also be useful as a coating for a protective glazing for a photograph or a work of graphic art. Preferably the protective glazing should absorb over ninety-nine percent of light wavelengths shorter than 400 nanometers (nm). The glazing may be a sheet of plastic or glass. Glass used for picture frame glazings does not usually absorb wavelengths greater than about 320 nm.

A plant for producing resin-coated picture frame glass may be required to produce about twenty-five thousand square feet of coated glass per day. The resin layer is preferably applied to the glass by a process known as roll coating. In roll coating, a flowable resin composition is applied continuously to an elongated rubber roller. A sheet of the glass to be coated is passed beneath the rubber roller to receive a layer of the resin composition. The layer of resin composition is then cured, generally by heat curing. The curing is preferably effected quickly, so that storage for large areas of uncured product is not required. Prolonged storage of an uncured layer may also increase the chance that dust or other foreign particles may be permanently included in the cured layer.

Polysiloxane resins useful for a hard overcoating for plastic are disclosed in U.S. Pat. Nos. 4,355,135; 4,390,660; 4,156,056; 4,396,228; 4,419,405; and 4,436,924. U.S. Pat. No. 4,355,155 discloses a base resin formulation which includes a catalyst and a curing or crosslinking agent to accelerate the resin-curing process at relatively low temperatures. The resin may be cured at a temperature as low as about 50° C. It is also disclosed that the resin may be suitable for application by a number of methods including roll coating, although a roll coating process is not specifically described.

Problems have been encountered in applying a layer of ultraviolet-absorbing resin to a picture frame glazing using a roll coating process. Certain of these problems are discussed in detail in U.S. patent application Ser. No. 07/728,611, filed Jul. 11, 1991, by Stevenson et al., and entitled "A Protective Glazing and Process for making the same", and assigned to the assignee of the present application. For example, it was determined that the presence of a curing agent and catalyst in a resin composition is not in itself sufficient to promote rapid curing after a resin layer had been formed. It was found that a relatively high temperature of about 420° F. may significantly reduce curing time. At high temperatures, however, ultraviolet-absorbing material included in the resin composition may be volatilized during the curing process, thus reducing the ultraviolet blocking effectiveness of the cured resin layer. Ultraviolet-absorbing material may also be removed from the resin layer if the coated glazing is subsequently cleaned by a wet process.

A curing agent and a catalyst in a resin composition may cause it to begin to cure before it is applied. Thus storage life of the resin composition may be reduced. Precipitates may also form in the resin composition if it includes a curing agent and a catalyst. The precipitates may be observed in the cured resin layer as a "sparkling" effect.

Excessively rapid uncontrolled curing of a resin layer may prevent it from uniformly covering a surface and/or forming a smooth surface.

Another problem, which may be encountered in resins of any kind including an ultraviolet-absorbing material, is color control. Specifically, if the ultraviolet-absorbing material fully absorbs wavelengths less than about four hundred nanometers, it may also at least partially absorb some wavelengths in the blue portion of the visible spectrum. If some portion of the blue region of the visible spectrum is absorbed in preference to the red and green regions, the resin layer may take on a yellow color. Excessive yellow color may be aesthetically unacceptable in a glazing for works of graphic art. Such a glazing preferably has a neutral transmission color.

Accordingly, it is an object of the present invention to provide an ultraviolet-absorbing base resin formulation which will retain its ultraviolet blocking properties during heat curing.

It is another object of the present invention to provide an ultraviolet-absorbing cured resin layer which will retain its ultraviolet-absorbing properties after it is cleaned by a wet process.

It is yet another object of the invention to provide an ultraviolet base resin formulation specifically for use in a roll-coating process.

It is a further object of the invention to provide an ultraviolet-absorbing resin layer which has a substantially neutral transmission color.

SUMMARY OF THE INVENTION

The present invention is directed to a resin composition for forming an ultraviolet-absorbing polysiloxane resin layer on a transparent substrate. The composition includes an ultraviolet-absorbing material and a glycol having a high boiling point for controlling the viscosity of the composition and the cure rate. The composition may be cured at a temperature up to 420° F. The composition may also include a dye for correcting the transmission color of a layer formed from the composition.

Generally, the composition comprises a base resin including about 5 to 75 weight percent, based on the total solids of the base resin, of colloidal silica; about 0 to 50 weight percent, based on the total solids of the base resin, of a partial condensate of a silanol selected from the group of silanols having the formula $R_wSi(OH)_x$ or $R_ySi(OR')_z$ where $(w+x)$ or $(y+z)=4$, and R and R' are organic radicals without any crosslinking sites; and about 10 to 55 weight percent, based on the total solids of the base resin, of a partial condensate of a silanol having the formula $R''Si(OR''')_3$ where R'' is a hydrogen atom or an organic radical and R''' is an organic radical containing a crosslinking site; about 1 to 20 weight percent, based on the total solids of the base resin of an ultraviolet-absorbing material; and about 5 to 50 percent by volume, based on the volume of the composition, of a glycol having a boiling point greater than or equal to about 180° C. The ultraviolet blocking material may be 2, 2', 4, 4' tetrahydroxybenzophenone; the glycol may be hexylene glycol; and the dye may be a mixture of blue and red dyes.

A process for preparing the composition includes the following steps: (a) blending the silanols to form a first blend; (b) adding the colloidal silica to the first blend to form a second blend; (c) reacting the second blend at between about 100° F. and 150° F. for a predetermined time; (d) adding to the reacted second blend a glycol to form a third blend; (e) dispersing an ultraviolet-absorbing material in the third blend to form a fourth blend; and (f) maintaining the fourth blend at a temperature of between 100° F. and 150° F. for a predetermined time period to form the resin composition.

Following step (f) the resin composition may be cooled to room temperature. More glycol may be added to establish a predetermined solids level in the composition.

It is advantageous to agitate the blend during any of the process steps. It is preferable to continually agitate the blend during steps (a) through (e). The reaction temperature of between about 120° F. and 140° F. is preferably maintained through steps (d) and (e).

DESCRIPTION OF THE DRAWINGS

The accompanying drawings, which are incorporated in and constitute a part of the specification, schematically illustrate a preferred embodiment of the present invention and, together with the general description given above and the detailed description set forth below, serve to illustrate the principles of the invention.

DETAILED DESCRIPTION OF THE INVENTION

Figure 1:
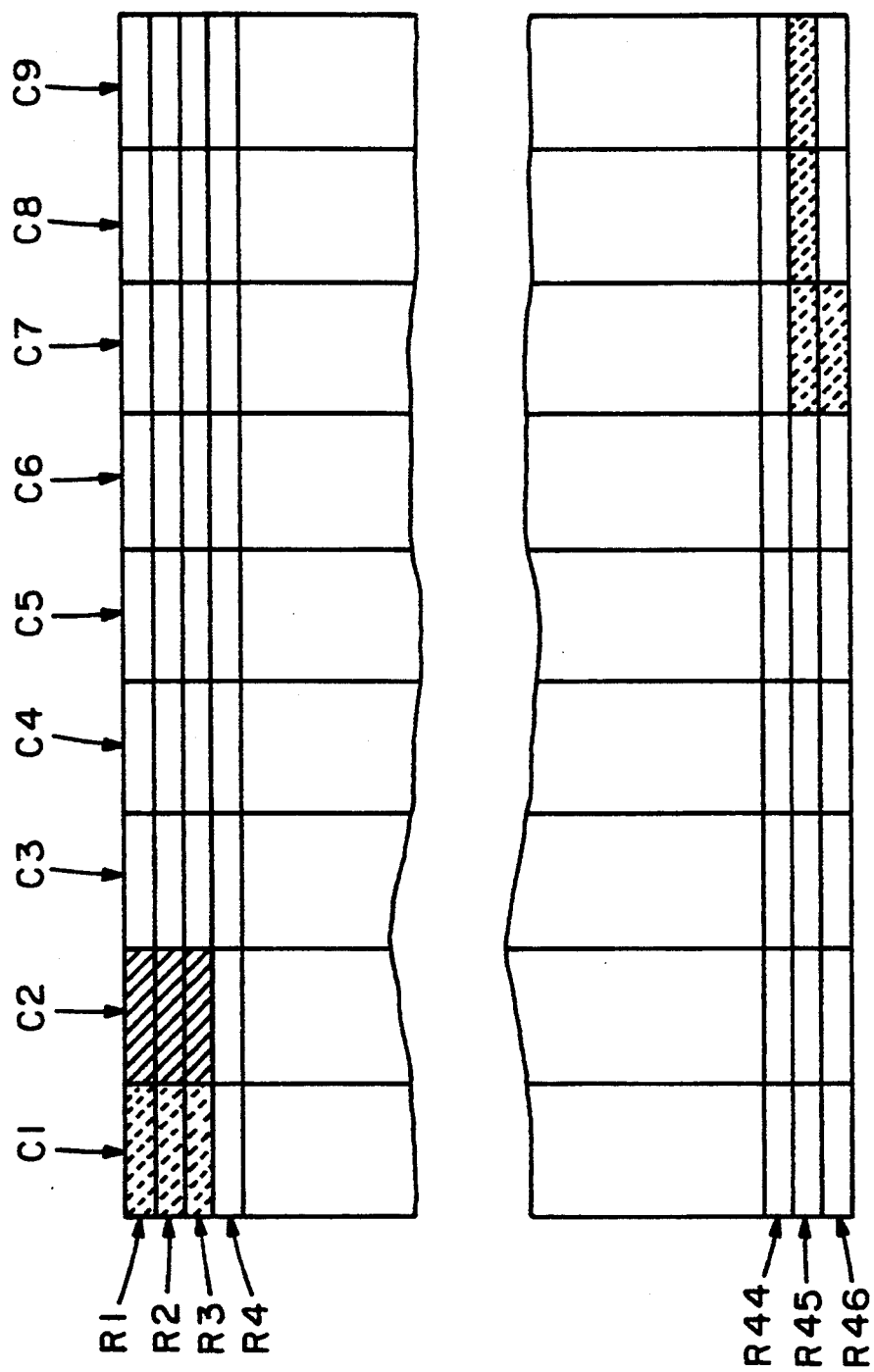
FIG. 1 schematically illustrates a computer spreadsheet for computing properties of a color correcting dye.

It has been determined that by omitting a curing agent and a curing catalyst from a polysiloxane resin composition, and by preparing the resin composition using a particular method and order of blending and reacting constituents of the composition, ultraviolet-absorbing material may be more strongly bonded into the resins. It has also been determined that by including a high boiling point additive such as a glycol in a resin composition, the resin composition will not begin to cure prematurely, and may have a higher viscosity the resin formulation based only on aqueous alcoholic dispersions of silanes. The higher viscosity resin composition is ideal for forming layers on glass using a roll coater. It will flow freely, yet build a relatively thick (about 6.5 micron) layer which may be smooth, uniform, and controllable in thickness to about plus or minus 1.0 micron.

The resin composition of the present invention may be cured at temperatures between about 390° F. and 420° F., which is high relative to the curing temperature for resins which include a catalyst and a curing agent. The high curing temperature, however, is lower than the softening point for most plate glass materials. As such, it does not present a problem in curing a resin layer on such glasses. At the high temperature, curing may occur within five minutes. Ultraviolet-absorbing material stays bonded in the base resin layer. No significant loss of UV absorbing material occurs due to volatilization during curing. Further, the ultraviolet-absorbing material may not removed or leached out of the cured layer by a wet cleaning process. Curing at a relatively high temperature in a short time may be advantageous in allowing a production line to operate faster. A short curing time also reduces the probability of quality degradation due to airborne particulates.

Resin compositions of the present invention generally comprise: (a) a base resin including (i) about 5 to 75 weight percent, based on the total solids of (a), of colloidal silica; (ii) about 0 to 50 weight percent, based on the total solids of (a), of a partial condensate of a silanol selected from the group of silanols having the formula $R_wSi(OH)_x$ or $R_ySi(OR')_z$ where $(w+x)$ or $(y+z)=4$, and R and R' are organic radicals without any crosslinking sites; and (iii) about 10 to 55 weight percent, based on the total solids of (a), of a partial condensate of a silanol having the formula $R''Si(OR''')_3$ where R'' is a hydrogen atom or an organic radical and R''' is an organic radical containing a crosslinking site; (b) about 1 to 20 weight percent, based on the total solids of (a), of an ultraviolet-absorbing material; and (c) about 5 to 50 percent by volume, based on the volume of the resin composition, of an additive having a boiling point greater than or equal to about 189° C.

Ultraviolet-absorbing materials may be selected from organic chemical groups including benzophenones, benzothiazoles and benzotriazoles. A preferred material is 2, 2', 4, 4' tetrahydroxybenzophenone. The compounds 2-hydroxy-4-methoxy-benzophenone; 2,4-dihydroxybenzophenone; and 2-(2'-hydroxy-3,5'-di-tertamylphenyl)benzotriazole have also been successfully incorporated in resin compositions.

Additives having a boiling point greater than 189° C. may include a material selected from the group consisting of glycols, glycol ethers, polyglycol ethers, and high boiling point alcohols. In general, a glycol additive is preferred. A preferred glycol is hexylene glycol having a boiling point of 189°. The color correcting dye is preferably dispersed in the additive before the additive is included in the resin.

In a preferred embodiment of the present invention, the resin composition may comprise a base resin (a) including (i) about 39 weight percent, based on the total solids of (a), of colloidal silica; (ii) about 16 weight percent, based on the total solids of (a), of a partial condensate of a silanol having the formula $CH_3Si(OCH_3)_3$ and about 23 weight percent, based on the total solids of (a), of a partial condensate of a silanol having the formula

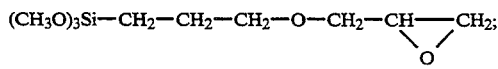

(iii) about 14 weight percent, based on the total solids of (a), of 2, 2', 4, 4' tetrahydroxybenzophenone; and (iv) about 5 to 55 percent by volume, based on the volume of the composition, of hexylene glycol.

A process for preparing the resin composition which significantly influences the suitability of the resin for roll coating has been developed. The process may also influence the ultraviolet-absorbing properties of a cured resin layer made with the resin composition. The order and method in which constituents of a resin formulation are blended and reacted has been found particularly important in providing optimum ultraviolet-absorbing properties.

A preferred process of preparing a resin composition of the present invention is set forth in detail below. The process is described in terms of the materials of the above-described preferred resin composition. The process is, however, applicable to other compositions defined by the above-described general specification of the resin composition.

Predetermined proportions of the silanols glycidoxypropyltrimethoxysilane and methyltrimethoxysilane are combined, in a heat jacketed reaction vessel, or a vessel including heat transfer coils to form a silanol blend. The heat transfer coils, for example, may be electrically heated or heated by a hot fluid or a vapor such as steam. The silanol blend is warmed to a temperature between about 100° F. and 150° F., preferably to a temperature of about 120° F. This first blend is agitated at a high speed. The blend may be agitated by a rotary mechanical dispersion mixer commonly used in the art. The agitation speed may be between about between about 500 and 1500 revolutions per minute (r.p.m). The blend is preferably continuously agitated.

A predetermined proportion of a water-based colloidal, silica is added to the silanol blend. The silica may be added as the silanol blend is agitated. Preferably, the agitation is continuous. The colloidal silica preferably has an acidic pH value. The pH value may be between about 2.5 and 3.0. The combination of the colloidal silica and the silanol blend may be referred to as a silica-silanol or second blend.

The combination of the silanol blend and the colloidal silica produces an exothermic reaction. Methyl alcohol is generated as reaction product.

The silica-silanol blend is raised to a temperature of about 150° F. The blend is preferably held at 150° F. for at least one hour. The silica-silanol blend is then allowed to cool to a temperature of about 140° F. It is preferably held at that temperature for at least 6 hours. The silica-silanol blend should be agitated during the reaction period. Preferably, the agitation is continuous.

Between about fifty and ninety percent of a predetermined proportion of hexylene glycol is added to the silica-silanol blend. The blend should be agitated and the temperature maintained during the addition of the glycol. Preferably, the blend should be continually agitated.

The silica-silanol blend including the hexylene glycol may be referred to as the silica-silanol-glycol or third blend.

Next, a predetermined proportion of 2, 2', 4, 4' tetrahydroxybenzophenone is added to the silica-silanol-glycol blend. The blend should be agitated and the temperature of about 140° F. maintained during the addition of the 2, 2', 4, 4' tetrahydroxybenzophenone Preferably the agitation and the temperature are maintained for a total time of at least one hour. The resulting blend may be referred to as a silica-silanol-glycol-benzophenone or fourth blend. The blend preferably should be continually agitated during the addition. It has been found that last described process step is important in promoting what is believed to be a substitution reaction between epoxy functionality of the silanol and hydroxyl groups in the UV absorbing material.

The process is completed by cooling the silica-silanol-glycol-benzophenone blend to room temperature and adding the remaining fraction of the hexylene glycol to form the final resin composition. Agitation is preferably continued during cooling.

If a color correcting dye is included in the resin composition, it is preferably added to the hexylene glycol before the hexylene glycol is included in the composition.

As already discussed, an ultraviolet-absorbing material incorporated in a resin layer may absorb a portion of the blue components of visible light and may thus cause a resin layer to have a yellow transmission color. The yellow transmission color may be neutralized by adding a dye to the resin composition from which the layer is formed. The dye may absorb a portion of the red and green components of visible light, i.e. it may absorb yellow light. If the red and green (or yellow) light is absorbed in an amount perceptibly equal to the amount of blue light absorbed, the resin may have a neutral transmission color. Generally the dye may have a violet or purple color and may be a mixture of red and blue dyes. A method for determining more precisely the color of a dye useful for neutralizing yellow coloration is a set forth in detail below.

The dye may be a mixture of two or more solvent soluble dyes, for example a cobalt complex dye having the color index number Solvent Red 125 and a copper phthalocyanine dye having the color index number Solvent Blue 67. Solvent Red 125 and Solvent Blue 67 may be obtained from the Ciba Geigy Corporation of Hawthorne, N.Y. under the trade names Orasol Red G and Orasol Blue GN, respectively. Specifically, when the ultraviolet-absoring material is 2,2', 4, 4' tetrahydroxybenzophenone in the proportion of about 14.0 weight percent, the dye mixture may consist of 2.5 parts Orasol Blue GN and 1.0 parts Orasol Red G in the proportion of about 0.0047 weight percent of the total solids of the base resin composition.

As discussed above, a color correcting dye may be chosen such that it absorbs green and red wavelengths of light perceptibly equal to the amount of blue light absorbed by the ultraviolet-absorbing agent. Thus, the total absorption includes perceptibly equal amounts of all primary colors. As such, the transmission color through the substrate is substantially neutral.

Generally, as the wavelength of the absorbed ultraviolet light increases, the transmitted light becomes more yellow. If such is the case, more dye must be added to neutralize the yellow color. The quantity of dye required to effect color correction may be up to about 0.1 weight percent, based on the total solids of the resin composition. Adding the dye to the glycol additive provides more precise control over the dying operation. An immersion method, i.e. immersing a cured resin layer in the dye, may not be suitable for introducing such small quantities of dye.

The specific quantity of dye added may vary widely, depending on the type and origin of the dye. The quantity may be between about 0.0001 and 0.05 weight percent, based on the total solids of the resin composition. A method of determining a suitable dye color, independent of the type and origin of the dye, will now be described.

A test glazing is coated with a resin layer using a resin composition without a color-correcting dye. A transmission spectrum (transmission as a function of wavelength) of the glazing is measured. The spectrum should preferably include the wavelength interval from 380 nm to 780 nm. Using spreadsheet software such as "EXCEL", available from Microsoft of Redmond, Wash., a worksheet may be set up as shown in FIG. 1. In column C1 from row R4 to row R44, wavelength values from 380 to 780 nm are entered at 10 nm intervals. In column C2 from row R4 to row R44, the transmission values, for the appropriate wavelengths, of the resin-coated test glazing are entered. In column C3 from row R4 to row R44, the values of radiated intensity of a CIE standard illuminant such as illuminant "C" are entered. In columns C4, C5 and C6 from row R4 to row R44, the of the CIE standard observer response values x bar, y bar, and z bar, respectively, are entered. The calculation of the CIE color coordinates may be accomplished by multiplying in turn the x bar, y bar and z bar values by the corresponding transmission and radiated intensity values and entering the results in columns C7, C8, and C9, respectively, from row R4 to row R44. The values in columns C7 rows 4 to 44 are summed in cell C7/R45 (shaded). The sum represents the CIE integral value X. The process is repeated to give the CIE integral values Y and Z in shaded cells C8/R45, and C9/R45 respectively. The X, Y, and Z integral values are summed and entered in cell C7/R46. The CIE color coordinates (x, y, and z), represent the integral values X, Y, and Z as a decimal fraction of the sum of X, Y, and Z. They may be calculated and displayed in column C1 rows R1 to R3 (shaded). The x, y, and z values for the standard illuminant (the neutral point) may be displayed in the shaded cells C2/R1, C2/R2, and C2/R3 to permit a rapid comparison with the coordinates of the glazing.

Once the coordinates of the resin-coated glazing without the correcting dye are calculated and displayed, one or more of the tabulated wavelengths between about 500 nanometers and 700 nanometers may be selected. For example, some wavelength value representing green, for example 520 nm, and some value representing red, for example 630 nm, may be selected. The transmission values at the selected wavelengths are reduced until the coordinates of the glazing in the shaded cells of column C1 match the coordinates of the illuminant in column C2. If a match can not be obtained when transmission is reduced to zero at the selected wavelength or wavelengths, additional red or green wavelengths may be selected and transmission reduced until a match is obtained.

When a satisfactory match has been obtained, color coordinates for the correcting dye may be determined from the reduced transmission values at the selected wavelengths. For example, the transmission values in the blue region of the spectrum, that is at wavelengths less than about 500 nm, may be set to equal to the highest values of transmission in the spectrum of the glazing. The transmission values at wavelengths less 500 nm are strongly influenced by absorption in the ultraviolet-absorbing material in the resin. Setting such transmission values equal to the highest values in the spectrum thus produces the effect of removing the ultraviolet-absorbing material from the resin. That which remains is equivalent to the glazing coated with a resin containing only a correcting dye. The coordinates in column C1 now represent the "dye" that has been created by the selected reduction of red and green wavelengths. Any real dye which can provide the computed color coordinates when present in a resin layer may be used to make the color correction with that particular resin layer. The transmission spectrum of the real dye may be different from the transmission versus wavelength values represented on the spreadsheet.

Dye color coordinates calculated according to the above procedure will be very close to a neutral point on a CIE color coordinate diagram, i.e., the color will have a very low saturation. As such, the actual hue represented by the coordinates would, in practice, be very difficult to judge by eye. A procedure for determining a practical dye mixture is as follows.

Figure 2:
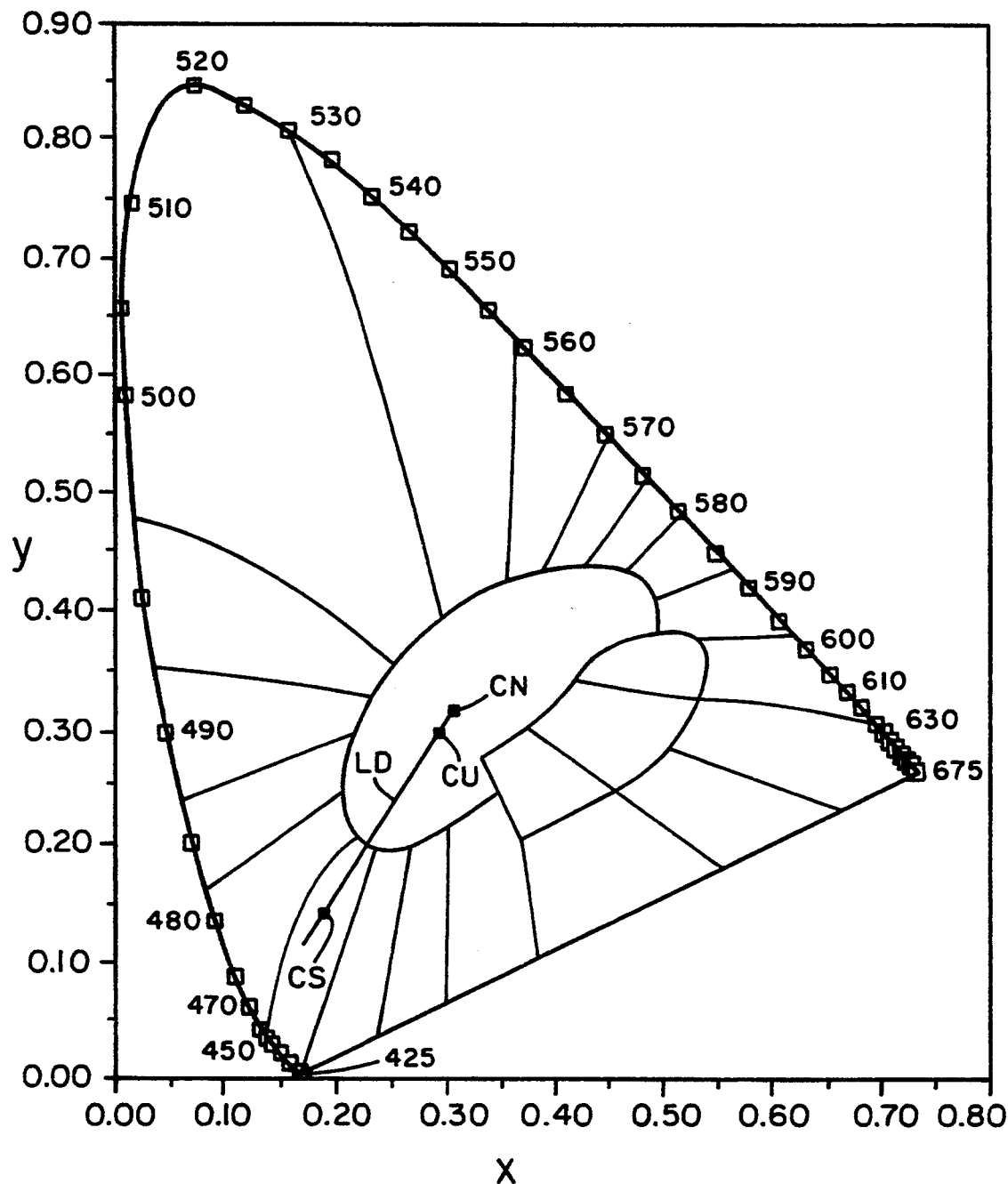
FIG. 2 schematically illustrates how a CIE color coordinate diagram is used for computing color coordinates of a color correcting dye.

The dye color coordinates calculated according to the above procedure are plotted on a CIE coordinate diagram along with the coordinates of the illuminant or neutral point. This is illustrated in FIG. 2. The point CN represents the coordinates of the standard illuminant, such as illuminant "C" or a predetermined neutral point. The point CU represents the coordinates of the correcting dye. A straight line LC is drawn between neutral point CN and dye point CU. Any set of coordinates lying on line LD will represent an adequate approximation a dye having the same hue, but different color saturations. A color represented by point CS is very saturated and the hue is readily distinguishable by eye from adjacent hues on the CIE diagram.

A concentrated dye of the correct hue may be prepared by mixing a red dye and a blue dye in a container and matching the color against a sample known to have coordinates lying on line LD. A more accurate technique is to employ a colorimeter such as the "Hunterlab Ultrascan Colorimeter", available from Hunter Associates Laboratory of Reston, Va. The concentrated dyes may be mixed in a sample cell, and proportions of red and blue adjusted until the color coordinates of the dye in the cell, measured on the colorimeter fall on line LD. The concentrated dye mixture may then be diluted with a neutral colored solvent until the measured coordinates match the actual dye point CU. Thus, the dye mixture proportions and amount of dye required to effect a proper color correction may be established.

The present invention has been defined in terms of preferred and other embodiments. The present invention, however, is not restricted to the embodiments described. Rather, the present invention is defined by the following claims.

What is claimed is:

1. A process for preparing a resin composition, comprising the following steps:
   (a) preparing a first blend, including predetermined portions of a first silanol selected from the group of silanols having the formula $R_wSi(OH)$ or $R_ySi(OR')_z$ where $(w+x)$ or $(y+z)=4$, and R and R' are organic radicals without any crosslinking sites, and a second silanol having the formula $R''Si(OR''')_3$ where R'' is a hydrogen atom or an organic radical and R''' is an organic radical containing a crosslinking site.

(b) heating said first blend to a temperature of 100° F. to 150° F.;

(c) adding a predetermined proportion of a water-based colloidal silica to said first blend to form a second blend;

(d) reacting said second blend at a temperature of 100° F. to 150° F. for a predetermined time period;

(e) adding to said second blend a first predetermined portion of an organic solvent which is a liquid at room temperature and having a boiling point greater than 189° C. to form a third blend;

(f) adding a predetermined portion of an ultraviolet-absorbing material to said third blend to form a forth blend; and (g) maintaining said fourth blend at a temperature between 100° F. and 150° F. for a predetermined time period to form the resin composition.

2. The process of claim 1 further including adding to resin composition a second predetermined proportion of an organic solvent which is a liquid at room temperature and having a boiling point greater than or equal to about 189° C.

3. The process of claim 1 wherein at least one of steps (a) through (f) includes agitating the blend during the process step.

4. The process of claim 1 wherein at least one of steps (a) through (f) includes continuously agitating the blend during the process step.

5. The process of claim 1 wherein said ultraviolet-absorbing material is selected from the group consisting of benzophenones, benzothiazoles and benzotriazoles.

6. The process of claim 5 wherein said additive includes a material selected from the group consisting of glycols, glycol ethers, polyglycol ethers, and alcohols.

7. A process for preparing a resin composition, comprising the following steps:

(a) preparing a first blend including predetermined portions of methyltrimethoxysilane and glycidoxypropyltrimethoxysilane;

(b) heating said first blend to a temperature of about 120° F.;

(c) adding a predetermined proportion of water-based colloidal silica to said first blend to form a second blend;

(d) reacting said second blend at a temperature of about 140° F. for at least six hours;

(e) adding a first predetermined proportion of hexylene glycol to said second blend to form a third blend;

(f) adding a predetermined proportion of 2, 2' 4, 4' tetrahydroxybenzophenone to said third blend to form a fourth blend; and (g) maintaining said fourth blend at a temperature of about 140° F. for at least one hour to form the resin composition.

8. The process of claim 7 further including adding a second predetermined proportion of hexylene glycol to the resin composition to adjust the solids level thereof.

9. The process of claim 7 wherein at least one of process steps (a) through (g) includes agitating the blend during the process step.

10. The process of claim 7 wherein at least one of process steps (a) through (g) includes continuously agitating the blend during the process step.

* * * * *